Jan. 15, 1963 R. WEISS 3,073,227
PROTECTIVE HOUSING FOR PHOTOGRAPHIC CAMERAS
Original Filed June 29, 1954 6 Sheets-Sheet 1

Jan. 15, 1963    R. WEISS    3,073,227
PROTECTIVE HOUSING FOR PHOTOGRAPHIC CAMERAS
Original Filed June 29, 1954

Jan. 15, 1963 R. WEISS 3,073,227
PROTECTIVE HOUSING FOR PHOTOGRAPHIC CAMERAS
Original Filed June 29, 1954 6 Sheets-Sheet 6

Fig. 9

United States Patent Office 3,073,227
Patented Jan. 15, 1963

3,073,227
PROTECTIVE HOUSING FOR PHOTOGRAPHIC
CAMERAS
Richard Weiss, Braunschweig, Germany, assignor to
Franke & Heidecke, Fabrik Photographischer Präzi-
sions-Apparate, Braunschweig, Germany, a German
firm
Original application June 29, 1954, Ser. No. 440,198, now
Patent No. 2,926,572, dated Mar. 1, 1960. Divided
and this application Oct. 13, 1959, Ser. No. 853,670
Claims priority, application Germany July 1, 1953
9 Claims. (Cl. 95—11)

This invention relates to a protective housing for en-closing a photographic camera, and especially a water-tight housing for enclosing a roll film camera in such manner that underwater pictures may be taken by a swim-mer carrying the housing with a camera enclosed therein.

An object of the invention is the provision of generally improved and more satisfactory equipment of this kind.

Another object is the provision of a housing so de-signed and constructed that the camera may be placed and secured therein with a minimum of effort, and so that the housing may be opened easily and quickly to a sufficient extent to permit the removal of an exposed roll of film and substitution of a fresh roll of film.

A further object is the provision of a housing so de-signed and constructed that it may be used with a com-mercial form of roll film camera without any change whatever in most of the features of the camera and with only a minimum change in a few parts of the camera which can easily be changed.

A still further object is the provision of a housing hav-ing externally accessible controls for operating the vari-ous parts of the camera, which controls are easily con-nected operatively to the corresponding parts of the cam-era itself upon insertion of the camera into the housing, and are easily disconnected upon removal of the camera from the housing, without requiring any tools or any changes whatever in the normal operating parts of the camera, such as the parts for winding film, tensioning the shutter, adjusting the shutter speed, adjusting the dia-phragm, and focusing.

These and other desirable objects may be attained in the manner disclosed as an illustrative embodiment of the invention in the following description and in the accom-panying drawings forming a part hereof, in which:

FIG. 8 is a perspective view of the gearing and asso-ciated parts used in the second form of speed and aper-ture adjustment as illustrated in FIG. 7.

Similar reference numerals throughout the several views indicate the same parts.

The housing of the present invention may, of course, be changed in various minor details to adapt it to use with various makes or models of photographic cameras. The details herein specifically disclosed as an exemplary em-bodiment of the invention are intended for use with a twin lens reflex camera of the kind known as the "Rollei-flex" camera manufactured for some years past by the firm of Franke & Heidecke in Germany, and widely known and used in the United States of America and other countries. Although the present invention relates to the housing for containing the camera, rather than to the camera itself, a knowledge of the construction of the camera is desirable in order that one may understand how the camera within the housing is operated and ad-justed from the various controls externally accessible on the housing. The present disclosure presupposes that the reader will have knowledge of the construction of the "Rolleiflex" camera. Those who are not already familiar with the camera are referred to the book "Rolleiflex Pho-tography, Handbook of the Rolleiflex and Rolleicord Cameras" by Jacob Deschin, published 1952 by Camera Craft Publishing Company, San Francisco, California (192 pages) and to the pamphlet publication "Rolleiflex 2.8C in Practical Use" published 1953 by Franke & Heidecke, the manufacturers of the camera, a copy of which pamphlet publication is believed to be available in the Scientific Library of the U.S. Patent Office.

The problems connected with satisfactory underwater photography by swimmers using small hand cameras are not easy of solution. A watertight supplementary casing or housing is, of course, necessary to contain the camera. When using a high grade camera as distinguished from an inexpensive box camera, it is necessary to provide ex-ternal manipulating means, not only for winding the film and operating the shutter, but also for adjusting the shut-ter speed, adjusting the diaphragm aperture, and pref-erably also for changing filters, if one is to take advan-tage of the maximum possibilities of a high grade camera. In addition, if the camera happens to be of the reflex focusing type, it is desirable to provide some means whereby the swimmer may see the focusing screen within his range of vision while he is looking forwardly in the direction in which he swims. This cannot be done with-out special provision, because in the ordinary reflex focus-ing camera, the focusing screen is arranged horizontally at the top of the camera, and in the absence of some spe-cial provision the swimmer would have to look down-wardly onto the focusing screen to see what is within the field of view of his camera, and then would have to shift his head to look forwardly to see where he is swimming. But the present invention takes care even of this matter, requiring only a slight shift of the eyes of the swimmer from the forward direction in which he is swimming to an obliquely downward direction to see the view finder of the camera.

Referring now especially to FIGS. 1–4 of the drawings, the housing of the present invention comprises in general an upper part 21 and a lower part 23 adapted to fit tightly together along a parting line provided with a sealing gasket 25. The parting line inclines slightly downwardly from front to rear, so as to pass above a front window in the front wall of the bottom housing section 23 and below a rear window at the back of the upper housing section 21, as seen especially in FIG. 3. These windows will be described in greater detail below.

When the two parts of the housing are in closed position relative to each other, they are held tightly against each other, to make a watertight joint at the gasket 25, by means of a stirrup or bail comprising side arms 31 pivoted to the upper housing section on the pivots 33 and having a cross bar 35 extending between the two side arms 31 at their extreme outer or free ends, the cross bar 35 being rotatable in the arms 31 in journals or bearings which are eccentric with respect to a portion of the cross bar at the center line of the housing, as indicated at 37. A short handle 39 is attached to the cross bar 35 near the center thereof, and serves to turn the same relative to its supporting arms 31.

A longitudinal rib formed on the bottom of the lower housing section 23 is provided with an arcuate depression 41 which forms a seat or socket for receiving the cross bar 35 when the housing is in closed position. To close the housing in a watertight manner, the bail or stirrup comprising the parts 31 and 35 is swung downwardly from the position shown in FIG. 3 to the position shown in FIG. 1, until the cross bar 35 of the bail lies opposite the notch or recess 41 in the lower housing section. The handle 39 at this time points rearwardly and the eccentric 37 is in its released position, not pressing tightly into the recess 41. The handle 39 is then turned clockwise (when viewed as in FIGS. 1 and 3) through approximately 180°, to swing it to the position shown in FIG. 3. This rotation of the cross bar 35 and its eccentric 37 tightens the eccentric firmly into the notch or recess 41 of the lower housing section 23, thus producing a strong upward pressure on the bottom of the housing section 23 and likewise pulling strongly downwardly (through the pivot 33) on the upper housing section 21, to compress the sealing gasket 25 firmly between these two sections to make a watertight joint.

Figures 3, 4:
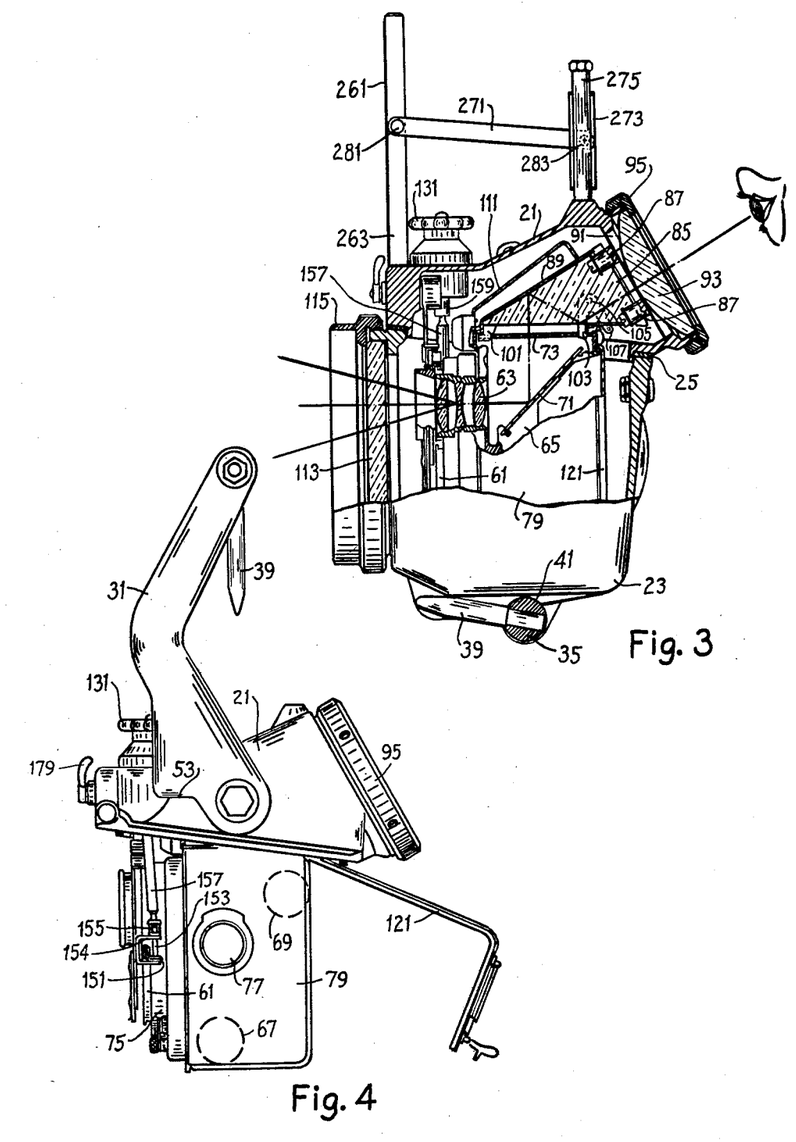
FIG. 3 is a view partly in side elevation and mainly in central vertical section through the construction shown in FIG. 1.
FIG. 4 is a side elevation of the parts with the lower portion of the housing completely removed, showing the camera supported from the top portion of the housing and showing the back or closure of the camera in open position for changing the roll of film.

When the eccentric 37 has thus been positioned in its effective locking position, the handle 39 lies in a longitudinal groove formed centrally in the bottom of the housing section 23, between two ribs 43 arranged on either side of such groove, this position being well seen in FIG. 3. The ribs 43 thus serve as adequate protection for the handle 39, guarding the handle against accidental contact with external objects.

Figure 2:
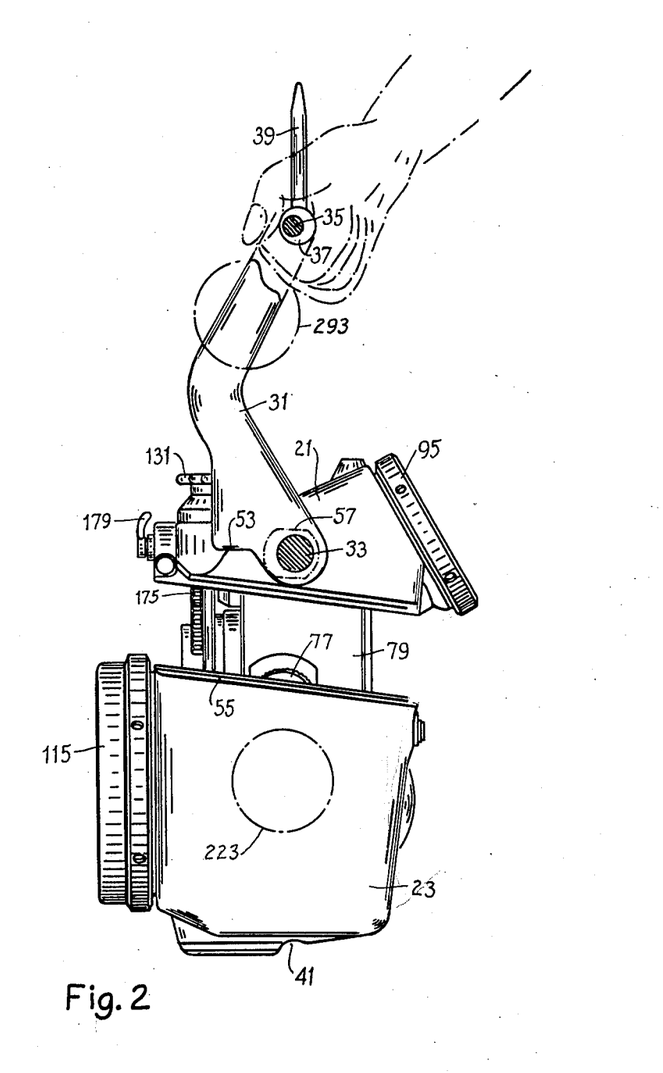
FIG. 2 is a side elevation of the housing and camera (but with certain parts omitted for clarity) showing the clamping bail or stirrup swung upwardly to its completely released position and showing the lower part of the hous-ing partly separated from the upper part thereof, during opening or closing of the housing.

When the housing is to be opened, for changing the film or perhaps for complete removal of the camera from its protective housing, the handle 39 is turned counterclockwise (when viewed from the left as in FIG. 3) thereby releasing pressure of the eccentric 37 against the bottom of the lower housing section 2. Then the entire bail or stirrup 31, 35 is swung rearwardly and upwardly on its trunnions 33 to a position above the upper section 21 of the housing, as shown in FIG. 2, in which position the cross bar 35 forms a convenient handle to be grasped for supporting the upper part of the housing and lifting it upwardly off of the lower part of the housing. If the upper and lower housing sections 21 and 23 stick to each other, the bail may be swung further in a counterclockwise direction beyond the position shown in FIG. 2, whereupon shoulders 53 formed on both of the side arms 31 will swing around to engage and press downwardly on lateral flanges 55 formed at the top edge of the lower housing section 23, to separate the two housing sections forcibly from each other, with very little effort on the part of the operator.

To insure tight closing of the two housing sections against each other even after the parts have been used long enough to produce some wear, the trunnions 33 of the bail arms 31 are in the form of adjustable eccentrics. For example, these trunnions may be in the form of pins threaded laterally into the side walls of the housing section 21, and capable of being turned slightly by means of a wrench applied to flat spots 57 formed on the pins. The circular parts of the pins which form bearings for the arms 31 are offset eccentrically from the parts which are threaded into the walls of the housing.

In the preferred construction, for use with a twin lens reflex camera such as a "Rolleicord," the camera is preferably hung from its top and supported entirely from the upper section 21 of the housing, so that the bottom portion and side walls of the camera are freely accessible when the lower housing section 23 is dropped downwardly and removed, as in FIG. 4. As is well known by those familiar with these cameras, the front wall of the camera is provided with two lenses, a lower or picture taking lens the mount of which is indicated partially at 61, and an upper or finder lens indicated diagrammatically at 63. When a shutter (not shown) associated with the lower lens is opened, light enters the lower lens and passes into the exposure chamber 65, falling upon sensitized film which passes vertically across the rear part of the exposure chamber, from a film supply roll 67 to a film take-up or winding roll 69. Light entering the finder lens 63 passes rearwardly to a reflex mirror 71 where it is reflected upwardly to form an image on a viewing screen 73 (of ground glass, for example) extending horizontally across the top of the finder chamber, within and normally shadowed by an erectable and collapsible focusing hood. The general arrangement of the lenses and hood may be as shown, for example, in U.S. Patent 2,642,790 to Scholkemeier, while the construction of the hood itself may be similar to that shown in U.S. Patent 2,641,955 to Bretthauer. The upper and lower lenses of the camera are both mounted on a camera front member 75 which moves forwardly and backwardly for purposes of focusing, the focusing movements being controlled by a focusing knob 77 rotatably mounted on the left side wall of the main camera body 79.

As already intimated above, it is desirable, in a camera to be used by underwater swimmers, that the swimmer be able to observe the view finder of the camera while looking approximately forwardly in the direction in which he is swimming, rather than having to shift his head through a substantial angle and look directly downwardly onto the top of the camera. For this purpose, the upper casing section 21 of the housing according to the present invention is provided with a roof prism 85 permanently mounted in this upper section by screw and mounting posts 87 which engage a metal frame 89 surrounding certain parts of the prism to hold it securely, these prism mounting posts 87 being around the edges of a finder viewing window 91 which is closed in watertight manner by a lens 93 held in place by a retaining ring 95 screwed onto an upstanding flange formed on the housing around the window opening. A suitable watertight gasket is provided.

It is desirable, as already mentioned, to suspend the camera from its top and to mount it from the upper section 21 of the housing, rather than the lower section 23. For this purpose, the metal frame 89 which holds the roof prism 85 is provided at its forward corners with two hook-like projections 101 which extend downwardly and thence forwardly, through slots specially formed in the metal frame of the camera near the right and left front corners of the focusing screen 73. Near the right and left rear corners of the focusing screen, the metal frame is also provided with slots for engaging hooks 103 of latches which are pivoted at 105 to a stationary part of the housing 21 (for example, to the sides of the metal frame 89 which holds the roof prism) and which are spring pressed into latching position until released by finger pressure applied to the arms 107 of the latches 103. The only change necessary in the camera, to adapt it to use in the under-water housing of the present invention is the removal of the normal rear wall of the collapsible focusing hood. This is easily accomplished without damage to the camera, and the wall may be easily installed again when it is desired to use the camera once more in the normal manner, outside of the special housing. It is not necessary to provide special slots for receiving the hooks 101 and latches 103, because the top of the camera is normally provided with slots for receiving the side wings of the rear wall of the focusing hood when the same is collapsed or folded down to its flat condition. The removal of the rear wall of the hood makes these slots accessible for receiving the hooks 101 and latches 103, without further alteration.

To mount the camera in the special watertight housing, the front wall 111 of the focusing hood is erected to its upstanding position, and the camera is moved upwardly beneath the upper housing section 21, until the top edge of the front wall 111 of the hood is above the forward end of the roof prism 85, whereupon the front wall of the focusing hood is swung slightly rearwardly so that it will lie in an inclined position between the roof prism and the top wall of the housing section, as seen in FIG. 3. It is then an easy matter to manipulate the camera so that the hooks 101 extend into the slots near the forward corners of the focusing screen, and the camera is moved slightly rearwardly to catch the camera parts on the hooks 101. Then the rear corners of the camera are caught onto the spring latches 103, and the camera is thus anchored securely in place, supported from the housing section 21.

The lower housing section 23 is provided in its front wall with a large window, preferably of circular shape, closed in watertight manner by a transparent plate 113 of plane glass, seated on a watertight gasket and held in position by a retaining ring 115 screwed onto a flange surrounding the window and projecting forwardly from the front wall of the housing section 23. This window 113 is large enough to extend over the field of view of both the upper and lower lenses 63 and 61 of the camera, without obstructing or cutting down the view of either lens. Light entering the finder lens through the window 113 enters the finder chamber and is reflected in normal or usual manner by the mirror 71 onto the focusing screen 73. The image on this screen 73 is seen by light rays extending upwardly from the focusing screen to the upper roof surface of the roof prism, being reflected downwardly again to the lower surface of the prism, thence rearwardly as indicated diagrammatically by the dot dash line, and out through the plane rear surface (somewhat inclined, as shown) of the prism and through the plano-convex lens 53 which constitutes the eye piece for viewing the image on the focusing screen, the lens giving a clear, sharp, and somewhat enlarged view of the finder image.

One advantage of making the supplementary housing in this way and in mounting the camera in suspended position from the top section of the housing, is that the camera does not have to be removed entirely from the housing when it is desired to change film in the camera. In the "Rolleiflex" camera, the film spools 67 and 69 are accessible upon opening a camera back member 121 which is hinged at the top of the back wall of the camera and which is L-shaped so that it extends, when in closed position, down the back wall and along the bottom of the camera, being normally held by a latch near the bottom front corner of the camera. As well seen in FIG. 4, when the lower housing section 23 is removed, there is sufficient space to swing the camera back 121 to an open position adequate for changing the film spools, without removing the camera from the upper housing section 21.

In the above mentioned camera, as manufactured currently and for several years past, the shutter speed and the diaphragm aperture are adjusted by means of adjusting knobs placed on the movable focusing front 75 of the camera, at an elevation between the two lenses, and laterally spaced on opposite sides of the vertical center line of the camera. These adjusting knobs are of frusto-conical shape, and have serrations or teeth formed on the inclined edges of the knobs.

Figures 5, 6:
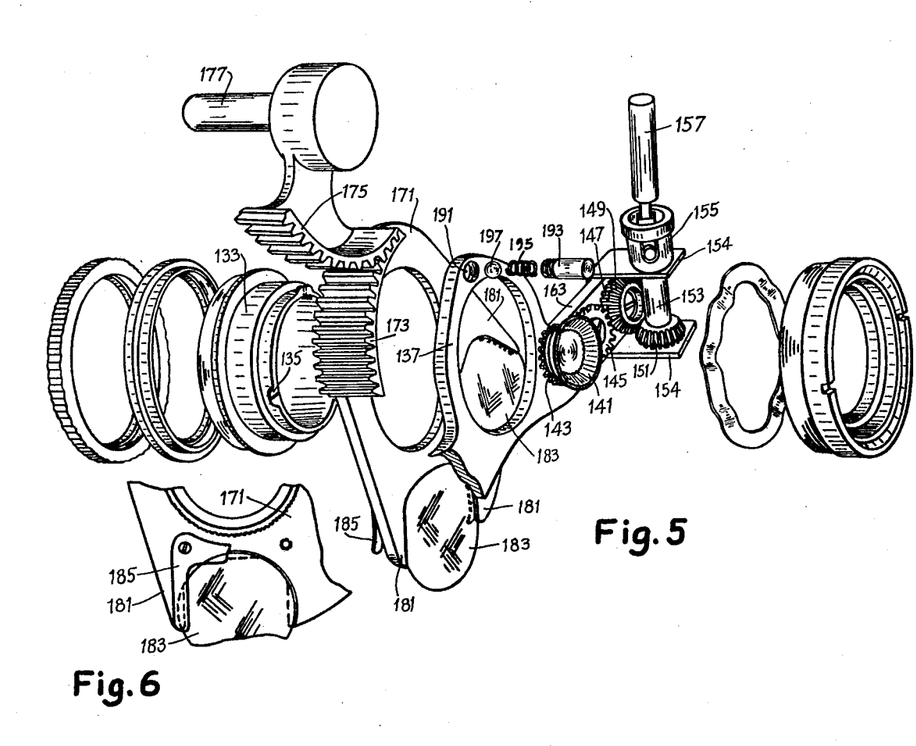
FIG. 5 is an exploded perspective view illustrating one form of mechanism for adjusting the shutter speed and diaphragm aperture from outside the watertight housing, and for changing the photographic filters from outside the housing.
FIG. 6 is a fragmentary face view of the filter holder.

In the embodiment of the invention illustrated in FIGS. 3–5, these speed and aperture adjusting knobs on the camera are turned by a pair of adjusting knobs 131 mounted side by side on the top of the upper housing section 21, near the front thereof. In the side views, FIGS. 3 and 4, the right hand one of these two knobs 131 is directly in line with the left hand one, so that only one knob shows. These knobs are omitted from FIG. 1 for the sake of increased clarity of other parts.

In the camera of the kind above mentioned, both the upper and lower lenses are provided with bayonet mounts on which various accessories may be mounted. In the present instance, the bayonet mount of the upper or finder lens is utilized for mounting the mechanism which connects the external adjusting knobs 131 on the housing with the speed and aperture adjusting knobs on the front of the camera. A barrel indicated in general at 133 (FIG. 5) has radially extending bayonet lugs 135 of the usual kind commonly found on lens accessories for the "Rolleiflex" camera. Thus the barrel 133 may be mounted firmly on the upper lens mount of the camera by moving the barrel axially toward the mount of the upper lens until the bayonet lugs 135 are engaged with the corresponding recesses of the finder lens mount, and by then turning the barrel through a slight angle.

This barrel has a cylindrical shoulder on which may be snugly mounted the central circular aperture of a mounting plate 137 having two arms extending in opposite directions. On each of these arms is rotatably mounted a cup like member 141 having its open side faced rearwardly and of frusto-conical shape provided with internal teeth to engage with the external frustoconical teeth of the adjusting knobs at the front of the camera. The member 141 is fastened to a spur gear 143 meshing with and driven by a spur gear 145 which in turn meshes with and is driven by a spur gear 147 integral or rigidly connected to a bevel gear 149 likewise mounted on the member 137 and meshing with another bevel gear 151 at the lower end of a short shaft 153 journaled in ears 154 mounted on and supported by the member 137. This vertical shaft 153 is connected through a universal joint 155 on the lower end of a longitudinally telescopic shaft 157, the upper end of which is connected through a similar universal joint 159 (FIG. 3) to the adjusting knob 131.

This same construction is duplicated at opposite sides of the center line of the camera, so that one set of these parts serves to connect the right hand external knob 131 with the right hand cup gear fitting over the right hand adjusting knob on the camera front, while the other set of parts serves to connect the left hand external knob 131 with the left hand cup gear 141 fitting over and driving the left hand adjusting knob on the camera front. Only the parts mounted on the right hand arm 163 of the member 137 are shown in FIG. 5, since the left hand arm is broken away in this figure, for greater clarity of other parts. By means of this mechanism, both the shutter speed and the diaphragm aperture may be easily adjusted from time to time, from the outside of the waterproof protective housing. Because of the provision of the universal joints and the slight telescoping which is allowed in the shaft 157, this adjusting mechanism does not interfere with the forward and back movements of the camera front 75 when the camera is being focused.

The same bayonet mounting barrel 133 may also be utilized for holding the mechanism to enable change of filters from outside the waterproof protective housing. Again referring to FIG. 5, the cylindrical shoulder of the barrel on which the member 137 is mounted serves also as a mounting for a rotatable plate 171 placed just ahead of the member 37. This plate 171 is provided with a wide gear segment 173 near its top, so placed as not to interfere with the plate 137 which, of course, remains stationary on the barrel 133 when the plate 171 is rotated thereon. The gear segment 173 meshes with a wide gear segment 175 fixed to a horizontal shaft 177 which extends out through the front wall of the upper housing section 21 approximately centrally thereof (see also FIGS. 1 and 3) and is provided at its front end with a handle 179 by which the gear segments 175 and 173 may be turned to rotate the plate 171 about the axis of the finder lens as a center of rotation.

This plate 171 is formed with any desired number of fork like projections 181, the spaces between two adjacent projections constituting a notch for holding any desired filter 183, the edges of which are received in slots milled in the edges of the main notch. Filters can be removed and replaced by other filters when desired, the selected filter being held in its notch by a spring clip 185.

Ordinarily there is no need to provide space for more than two filters on the member 171, as a selection of two filters is usually adequate for the pictures to be taken during any one diving operation. When the swimmer comes back to the surface he can, of course, open the housing and insert different filters, if desired. However, a greater number of filters may be accommodated if desired. All of the filters, whether two or more, are arranged concentrically about the axis of rotation of the member 171 as a center, the center of each filter being at the same distance from the center of rotation of the member 171 as the spacing of the optical axes of the two lenses from each other, since the member 171 rotates about the optical axis of the finder lens as a center, and the filters should, of course, be selectively brought to position on the optical axis of the picture taking lens.

Spring detent means is provided to indicate to the operator, by the sense of touch, when the selected filter is accurately aligned with the optical axis of the picture taking lens. Conveniently, the spring detent may be mounted on the member 137 which carries the time and aperture adjusting gearing, since this member 137 is held non-rotatable on the barrel 133 by the engagement of the cup gears 141 with the adjusting knobs on the camera. For example, the member 137 may be provided at a suitable place with a threaded bore 191 into which may be screwed a cartridge 193 containing a coil compression spring 195 pressing a ball detent 197 against the rear face of the filter carrier plate 171 which lies just in front of the member 137. Suitable notches or depressions are formed on the rear face of the carrier plate 171 in positions which come opposite the ball detent 197 when the respective filters are accurately aligned with the axis of the picture taking lens.

It is noted that the faces of the gear segments 173 and 175 are made sufficiently wide so that they will remain always in mesh with each other, notwithstanding the forward and backward movement of the gear segment 173 and filter carrying plate 171 when the camera front is moved forward and backward for focusing.

Figure 7:
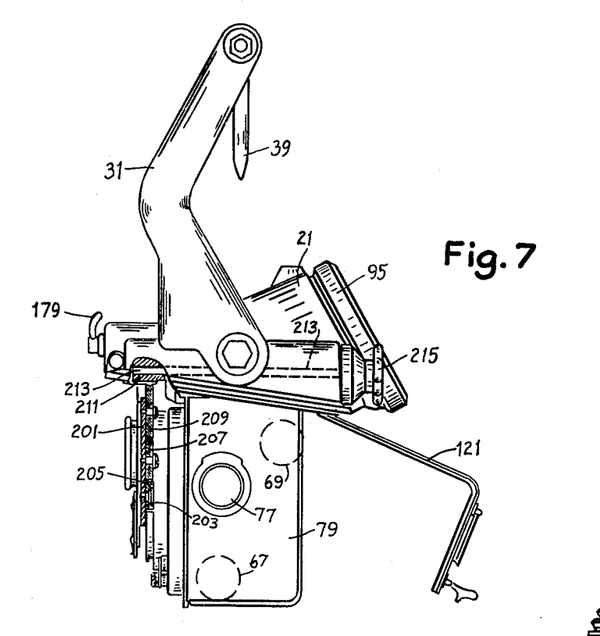
FIG. 7 is a view similar in general to FIG. 4, but illus-trating a different form of mechanism for adjusting the shutter speed and diaphragm aperture from outside of the housing.
Figure 8:
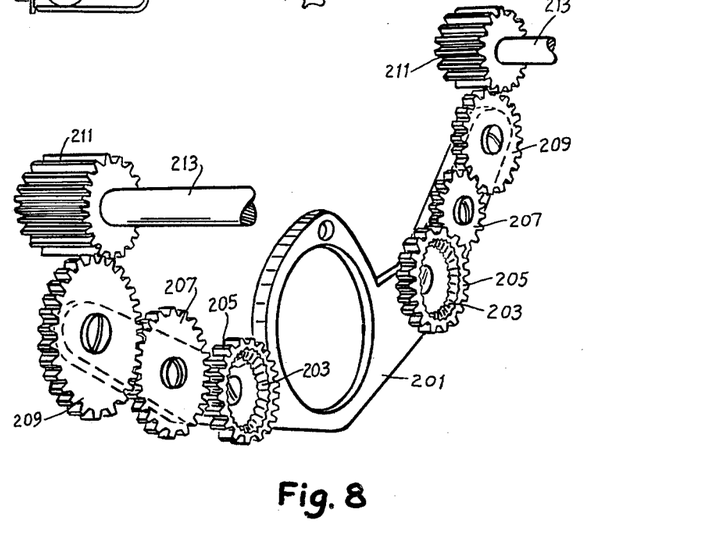

An alternative arrangement for adusting shutter speed and diaphragm aperture is illustrated in FIGS. 7 and 8. The plate 201 corresponds essentially to the plate 137 in the previous embodiment, and is similarly mounted on the barrel 133 which is engaged with the bayonet connection of the upper lens mount. Similarly, the member 201 has a pair of arms projecting in opposite directions from the center of the camera, which arms carry rotary members 203 formed with internal frusto-conical teeth to fit tightly over and engage with the external frusto-conical teeth of the adjusting knobs on the front of the camera, just as before. External spur teeth 205 on these members 203 mesh with spur gears 207 which in turn mesh with spur gears 209 mounted near the ends of the lateral arms of the member 201. These spur gears 209 mesh, in turn, with pinions 211 arranged above the respective spur gears 209 and fixed on the forward ends of shafts 213 arranged horizontally in the upper casing or housing section 21, parallel to each other and at opposite sides thereof, these shafts extending out through the rear of the housing and being provided at their rear ends with externally accessible knobs 215 for turning them.

One advantage of this construction, as compared with the previously described construction in which the adjusting knobs are at the top of the housing near the front, is that a greater length of each adjusting shaft is available for sealing by watertight packing, so that a more satisfactory watertight joint may be made. Another advantage is that the adjusting knobs are more easily accessible to the operator, who does not have to reach around to the front of the housing in order to get at them. Still another advantage is that when the camera is uncoupled or unlatched from the housing, it can simply be moved straight downwardly since the gears 209 will simply come away from their driving pinions 211 (which, incidentally, are made sufficiently long to insure engagement with the gears 209 during all backward and forward focusing movements of the camera front). Thus the member 201 which carries the adjusting gears stays on the camera until the camera is completely removed from the watertight housing, whereupon the member 201 may be removed from the camera (by taking off its supporting barrel 133) with greater facility. But in the previous construction described with reference to FIG. 5, it is usually necessary to remove the barrel 133 while the camera still remains attached to the upper housing section, in order that the member 137 and parts carried thereby, including the universal joint shafts or cardan shafts 157 may remain attached to the upper housing section while the camera is completely removed from the housing. Likewise the insertion of the camera in the housing is more convenient, when using the arrangement shown in FIGS. 7 and 8, for similar reasons.

When this alternative embodiment of means for adjusting shutter speed and diaphragm aperture is employed, the filter holder and the arrangement for changing from one filter to another may be exactly the same as before.

Figure 9:
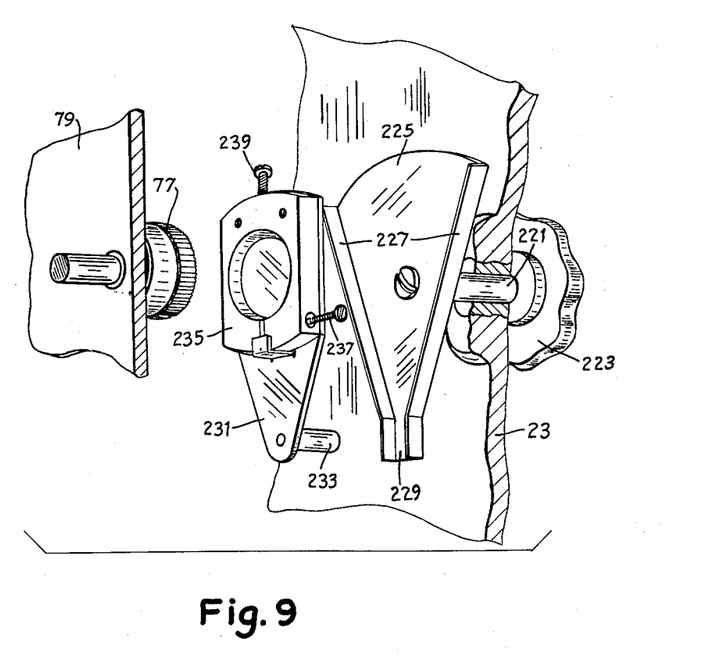
FIG. 9 is a perspective view of mechanism for rotating one rotatable part on the camera (for example, the focus-ing knob, or a film winding knob) from a manipulative part externally accessible on the housing.

In FIG. 9 there is shown an arrangement for operating, from outside the waterproof housing, the focusing knob 77 on the left hand side wall of the camera body. The left side wall of the lower housing section 23, at a point directly in line with the axis of rotation of the focusing knob 77, is provided with a shaft 221 having an operating knob 223 at its external end, and having at its inner end (within the housing) a plate 225 of approximately triangular shape having lateral flanges 227 along two of its edges, the flanges extending obliquely toward each other toward the apex of the triangle and being arranged parallel to each other near the apex, to form a narrow throat section 229. An intermediate crank element is adapted to be placed over and clamped on the usual focusing knob 77, this intermediate element comprising a plate 231 carrying a crank pin 233 projecting from one face, and carrying a split jaw 235 projecting from the other face, of the right size to fit over the knob 77 reasonably snugly. Then the split jaw is compressed to engage the knob tightly, by tightening a clamping screw 237 which draws the split parts of the jaw together, and as an extra precaution a set screw 239 is provided to bear radially against the knob 77.

By the use of this intermediate member, the focusing knob 77 is, in effect, transformed into a crank, the intermediate member being placed on the focusing knob before the camera is placed in the watertight housing. Then when the lower section of the housing is moved upwardly to close it against the upper housing section in which the camera has already been latched, the crank pin 233 is placed in its lowermost position and the triangular plate 225 is turned to a position with the wide space between the flanges 227 uppermost and with the narrow throat 229 at the bottom. Then as the housing section moves upwardly relative to the camera, the crank pin 223 first enters the wide end of the triangle and then is guided into the throat 229 just as the two housing sections reach their home position relative to each other. Hence any rotation of the adjusting knob 223 will cause corresponding rotation of the crank pin 233 and of the focusing knob 77.

The same arrangement may also be used for operating the film winding mechanism, which is controlled in the "Rolleiflex" camera by a crank on the right hand side of the camera body, and in the companion "Rolleicord" camera and certain other twin lens reflex cameras by a knob on the right hand side of the body. When the camera is already equipped with a crank, the intermediate transmission member 231, 233, 235 is omitted, of course, and the handle of the crank itself is received directly in the throat 229 of the plate 225. When the camera to be used with this housing is equipped with a knob rather than with a crank, then the intermediate transmission member 231, 233, 235 is first applied to the knob, to transform the knob into a crank.

All of the various shafts extending through the walls of the housing, for operating parts inside, are equipped with suitable watertight seals, gaskets, or packing, the exact details of which may be varied, as desired.

Figure 1:
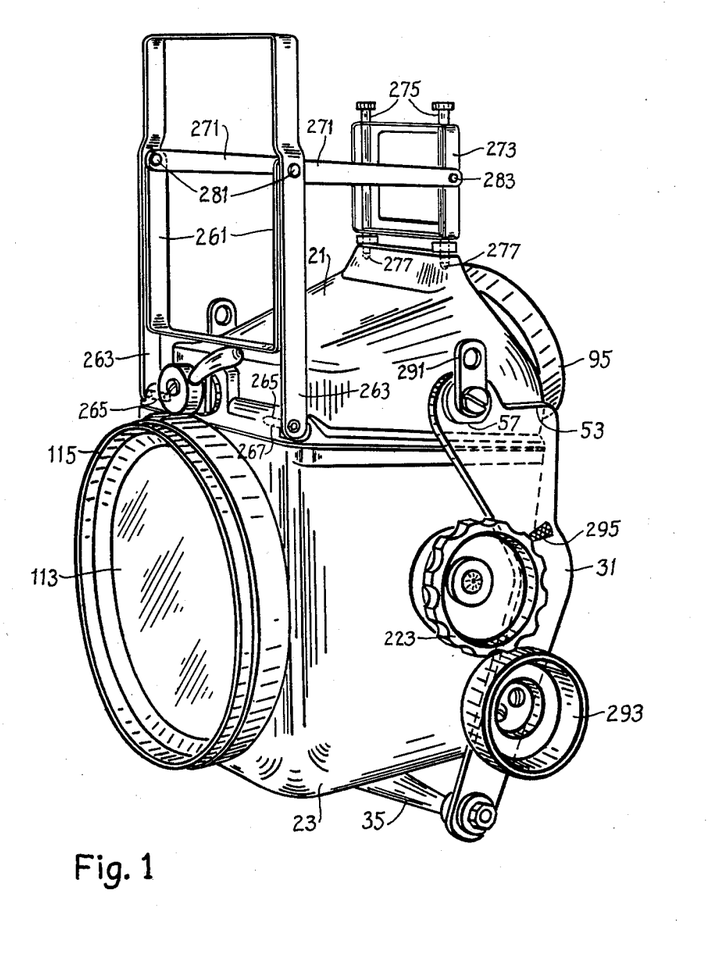
FIG. 1 is a perspective view of a housing in accordance with one embodiment of the invention, with the shutter speed and diaphragm aperture adjusting parts omitted for the sake of clarity, and with the supplementary direct view finder shown in place on the housing, the housing being viewed obliquely rearwardly from a point forward and to the left of the housing.

Even though the protective housing of the present invention is provided with means for viewing the focusing image on the screen, it is nevertheless desirable to equip the housing also with a direct view finder which may be used, for example, under unfavorable lighting conditions. Such a direct view finder is illustrated in FIGS. 1 and 3. The front member of the direct view finder is formed by a rectangular frame indicated in general at 261, having resilient side arms 263 which extend downwardly below the bottom cross member of the frame and which are provided with lateral pins 265 extending toward each other and received in a lateral bore 267 formed in the upper housing section 21. Thus it is very easy to remove the viewing frame from the housing by springing the arms 263 away from each other far enough to release the pins 265 from the bores 267, and the frame may be quickly installed on the housing by a reverse operation.

The front viewing frame 261 is held in erect position on the housing by side arms or struts 271 which extend rearwardly from intermediate points of each side member of the frame, to intermediate points of the side members of a rear rectangular frame 273 mounted on a pair of pins 275 extending vertically and having their lower ends threaded into tapped openings or bores 277 on the top of the housing section 21 near its rear end. Pivot pins 281 connect the struts 271 at their forward ends to the frame 261, and the rear ends of the struts are connected by pivot pins 283 to the rear frame 273. The rear frame is movable vertically to a limited extent on its supporting end guiding pins 275, for purposes of adjustment to correlate the field of view through this direct view finder with the actual field of view of the camera, and it may be retained in position, when once adjusted, by any suitable clamping means.

The trunnions 33 of the clamping bail or stirrup may be provided with hanger links 291 having holes for attachment to a neck strap or other suitable carrying device, as shown in FIG. 1. Referring also to FIG. 1, the side arm 31 of the clamping bail may be provided with a convenient hand grip or handle 293, and also may carry a conspicuous index mark 295 for cooperation with graduations on the knob 223.

It is seen from the foregoing disclosure that the abovementioned objects of the invention are well fulfilled. It is to be understood that the foregoing disclosure is given by way of illustrative example only, rather than by way of limitation, and that without departing from the invention, the details may be varied within the scope of the appended claims.

This application is a division of my application Serial No. 440,198, filed June 29, 1954, now Patent 2,926,572, granted March 1, 1960.

What is claimed is:

1. The combination with a photographic camera having two lenses and a bayonet mount associated with at least one of said lenses and a rotatable shutter control knob projecting forwardly near said lenses, of a bearing barrel engageable with and supported by the bayonet mount of one of said lenses, a support plate mounted on said bearing barrel in position to overlie said forwardly projecting control knob, a cup-shaped member rotatably mounted on said support plate in alinement with said control knob and in position to fit against and engage with said control knob to transmit rotary motion of said cup-shaped member to said control knob, intermeshing gears on said support plate for turning said cup-shaped member from a point remote from said control knob, a protective housing for surrounding said camera, a rotatable handle mounted externally of said housing, and means including a shaft mounted on said protective housing for operatively connecting said handle to said gearing to turn said control knob from turning motion of said external handle.

2. A construction as defined in claim 1, in which said camera lenses are mounted on a front member movable backwardly and forwardly relative to the protective housing enclosing the camera, for purposes of focusing, and in which said means operatively connecting said external handle to said gearing maintains connection therewith in all positions to which said camera front member may be adjusted during focusing.

3. A construction as defined in claim 1, further including a filter carrier plate rotatably mounted on said bearing barrel, a filter mounted on said carrier plate in position to swing to and from the optical axis of the other one of said lenses when said carrier plate is rotated on said bearing barrel, a handle externally mounted on said housing, and mechanism passing through said housing in watertight manner and operatively connecting said handle to said filter carrier plate to shift said filter to and from alinement with the optical axis of said other lens, upon external manipulation of said handle.

4. The combination with a photographic camera having a rotary operating part on one wall thereof, of a protective housing for surrounding and enclosing said camera to enable use of the camera in locations where an unprotected camera cannot be used, such as in taking pictures under water, a shaft extending through a wall of said housing in water-tight relation thereto and substantially in axial alinement with said rotary part of the camera mounted within said housing, an external accessible operating member mounted on said shaft exteriorly of said housing, and driving means on said shaft within said housing for operatively connecting said shaft in driving relation to said rotary operating part of said camera, said driving means including flanges mounted on said shaft and arranged approximately parallel to each other and relatively close to each other in a location spaced from said shaft to form between them a throat portion to receive a crank associated with said rotary operating part, said flanges diverging from each other in a general direction toward said shaft to provide a tapered entrance guide for guiding a crank into the throat portion of said flanges when the camera is inserted into said housing.

5. The combination with a photographic camera having a rotary operating part on one wall thereof, of a protective housing for surrounding and enclosing said camera to enable use of the camera in locations where an unprotected camera cannot be used, such as in taking pictures under water, a shaft extending through a wall of said housing in water-tight relation thereto and substantially in axial alinement with said rotary part of the camera mounted within said housing, an external accessible operating member mounted on said shaft exteriorly of said housing, and driving means on said shaft within said housing for operatively connecting said shaft in driving relation to said rotary operating part of said camera regardless of whether said rotary part is in the form of a knob or in the form of a crank, said driving means including flanges mounted on said shaft and arranged approximately parallel to each other and relatively close to each other in a location spaced from said shaft to form between them a throat portion to receive a crank to drive the same, said flanges diverging from each other in a general direction toward said shaft to provide a tapered entrance guide for guiding a crank into the throat portion of said flanges when the camera is inserted into said housing, said throat portion being adapted to receive and drive the crank when said rotary operating part of said camera is in the form of a crank, and an intermediate drive member for use when said rotary operating part of said camera is in the form of a knob, said intermediate drive member comprising a clamp for surrounding the periphery of the knob, means for clamping said clamp firmly on said knob, and a crank pin secured to said clamp at a distance offset from the axis of rotation of said knob, said crank pin being adapted to be received in said throat portion of said flanges to be driven thereby.

6. A construction as defined in claim 1, in which said shaft is an approximately vertical shaft extending upwardly through the top of said housing and said handle is mounted at the upper end of said shaft.

7. A construction as defined in claim 1, in which said gears on said support plate include a driving bevel gear with an approximately vertical axis and a driven bevel gear meshing therewith and operatively connected to said cup-shaped member, and in which said means including a shaft for operatively connecting said handle to said gearing includes an approximately vertical shaft extending upwardly from said driving bevel gear through the top of said housing to said handle and having joint means therein to permit said cup-shaped member and said driving bevel gear to move forwardly and backwardly within said housing without disturbing the operative connection between said handle and said cup-shaped member.

8. A construction as defined in claim 1, in which said shaft is an approximately horizontal shaft extending rearwardly through a rear wall portion of said housing and said handle is mounted at the rear end of said shaft.

9. A construction as defined in claim 1, in which said gears on said support plate include a spur gear rotatable about an approximately horizontal axis and operatively connected to said cup-shaped member, and in which said shaft is an approximately horizontal shaft extending rearwardly through a rear wall portion of said housing and carrying near its forward end a driving gear meshing with said spur gear, one of said gears being sufficiently wide in an axial direction so that said spur gear and said cup-shaped member may move forwardly and backwardly within said housing through an operative range without disturbing the operative connection between said handle and said cup-shaped member.

References Cited in the file of this patent

UNITED STATES PATENTS

| | | |
|---|---|---|
| 2,444,512 | Kath | July 6, 1948 |
| 2,487,868 | Grigsby | Nov. 15, 1949 |
| 2,865,271 | Klein | Dec. 23, 1958 |
| 2,883,919 | Joyet | Apr. 28, 1959 |
| 2,944,474 | Dennis | July 12, 1960 |

FOREIGN PATENTS

| | | |
|---|---|---|
| 1,019,148 | France | Oct. 22, 1952 |